United States Patent [19]

Kikuchi et al.

[11] Patent Number: 4,694,709
[45] Date of Patent: Sep. 22, 1987

[54] CONTROL OF A VEHICLE AUTOMATIC TRANSMISSION

[75] Inventors: Toshiyuki Kikuchi, Higashi-Hiroshima; Koichi Yamamoto, Hiroshima, both of Japan

[73] Assignee: Mazda Motor Corporation, Hiroshima, Japan

[21] Appl. No.: 772,427

[22] Filed: Sep. 4, 1985

[30] Foreign Application Priority Data

Sep. 8, 1984 [JP] Japan .................................. 59-188666
Sep. 8, 1984 [JP] Japan .................................. 59-188667

[51] Int. Cl.4 ............................................. B60K 41/06
[52] U.S. Cl. ..................................... 74/866; 364/424.1
[58] Field of Search ................ 74/865, 866; 364/424.1

[56] References Cited

U.S. PATENT DOCUMENTS 4,262,335 4/1981 Ahlen et al. ...................... 74/866 X
4,351,205 9/1982 Fischer ................................... 74/866
4,373,619 2/1983 Schritt et al. ..................... 74/866 X
4,499,793 2/1985 Jow et al. ............................ 74/866
4,503,733 3/1985 Hasegawa ......................... 74/866 X
4,513,639 4/1985 Hiramatsu .............................. 74/866
4,561,328 12/1985 Hiramatsu ........................ 74/866 X

FOREIGN PATENT DOCUMENTS

56-57524 5/1981 Japan .

Primary Examiner—Leslie Braun
Assistant Examiner—Dwight G. Diehl
Attorney, Agent, or Firm—Fleit, Jacobson, Cohn & Price

[57] ABSTRACT

A vehicle automatic transmission having a torque converter and a multiple-stage gear mechanism. When the vehicle is stopped and the shift lever is in the D-range, the gear mechanism is shifted to the highest gear stage if the vehicle brake is engaged and the engine is idling, so that transmission of the engine idling vibrations to the vehicle body can be prevented by the transmission.

2 Claims, 13 Drawing Figures

CONTROL OF A VEHICLE AUTOMATIC TRANSMISSION

BACKGROUND OF THE INVENTION

1. Field of the Invention

The present invention relates to a vehicle automatic transmission, and more particularly to a vehicle automatic transmission having a hydraulic torque converter and a multiple-stage transmission gear mechanism connected with the torque converter. More specifically, the present invention pertains to a control of a vehicle automatic transmission of the aforementioned type.

2. Description of the Prior Art

In a vehicle having an automatic transmission comprised of a torque converter and a multiple-stage transmission gear mechanism, a shift lever is provided for selecting one of an N-range (neutral), D-range, 2-range, 1-range, R-range (reverse) and P-position (parking). It has been experienced in this type of vehicle that if the vehicle is kept stationary with the shift lever positioned in a running range such as the D-range or the 2-range, the engine idle vibrations are transmitted through the transmission to the vehicle body disturbing the riding comfort. In order to solve the problem, the transmission gear mechanism may be brought into the neutral position even when the shift lever is in the running range. It should however be noted that this solution is not satisfactory because a shifting shock is produced when the shift lever is moved from the N-range to the running range, such as the D-range, 2-range and 1-range. This type of shifting shock is sometimes referred to as the "N-D shock" and caused by the fact that a power transmitting gear train is established in the transmission gear mechanism through engagements of appropriate friction members when the shift lever is actuated, to make it possible to transmit the engine output power through the gear mechanism to the wheels of the vehicle. This problem can be solved by having a higher gear stage such as a third or fourth gear stage to engage, in lieu of making the gear mechanism neutral, so that the driving torque transmitted to the driving wheels can be made smaller and the engine idle vibration transmitted to the vehicle body can therefore be reduced. Japanese patent application 54-131972 filed on Oct. 12, 1979, and disclosed for public inspection on May 20, 1981, under the disclosure number 56-57524 proposes, under a condition wherein the vehicle is stopped with the shift lever in a running range, to hold the gear mechanism in the first stage for a predetermined time and then automatically shift up to a higher stage, such as the third or fourth gear stage, after the predetermined time. With the control as proposed by the Japanese patent application, it is possible to start the vehicle smoothly utilizing the creep phenomenon of the torque converter within the predetermined time after a vehicle stop. It is also possible to reduce the engine idle vibrations transmitted to the vehicle body when the vehicle is kept in the stopped condition beyond the predetermined time.

It should, however, be noted that the control as proposed by the Japanese patent application is not satisfactory because the transmission of the engine idle vibrations cannot be suppressed during the predetermined time. Further, it becomes impossible to utilize the creep phenomenon of the torque converter for a smooth start of the vehicle after the vehicle has been stopped beyond the predetermined time.

SUMMARY OF THE INVENTION

It is therefore an object of the present invention to provide vehicle automatic transmission control means wherein the vehicle body vibrations can be suppressed and simultaneously assuring a smooth vehicle start.

Another object of the present invention is to provide vehicle automatic transmission control means of the aforementioned type wherein the gear mechanism is shifted to a higher gear stage when the engine output control member is in the minimum output position and the vehicle brake is engaged.

According to the present invention, the above and other objects can be accomplished in a vehicle having an engine provided with engine output control means having an idle position, vehicle brake means, an automatic transmission comprised of a torque converter, a multiple stage transmission gear mechanism connected with the torque converter and having a neutral gear stage, a first gear stage and at least one higher gear stage, gear stage selecting means for selecting one of the gear stages, and a shift lever having a neutral range and at least one running range for operating the gear stage selecting means so that the neutral gear stage is selected when the shift lever is in the neutral range and one of the first and higher gear stages is selected when the shift lever is in the running range. For that purpose, there are provided shift position detecting means for detecting that the shift lever is in the running range, engine idle detecting means for detecting that the engine output control means is in the idle position, vehicle step detecting means for detecting that the vehicle is stopped, brake detecting means for detecting that the vehicle brake means is engaged. Control means is further provided to receive signals from the aforementioned detecting means and operate the gear stage selecting means when it is detected that the shift lever is in the running range, the vehicle is stopped, the engine output control means is in the idle position and the vehicle brake mean is engaged. The control means functions to operate the gear stage selecting means when the above conditions are met, so that the gear mechanism is positioned in the higher gear stage.

When it is detected that the brake means is engaged while the engine is idling, it is judged that the driver is willing to maintain the vehicle stationary. Therefore, the control means operates the gear stage selecting means so that the higher gear stage is maintained. With this control it is possible to suppress transmission of the engine idling vibrations to the vehicle body. As soon as the brake means is released, it is judged that the driver is willing to start the vehicle, so that the gear mechanism is shifted down to the first gear stage for a smooth vehicle start.

Thus, according to the present invention, there is provided a vehicle having vehicle brake means, an engine provided with engine output control means having an idle position, an automatic transmission comprising a torque converter having a turbine, a multiple-stage transmission gear mechanism connected with the turbine of the torque converter and having a neutral gear stage, a first gear stage and at least one higher gear stage, gear stage selecting means for selecting one of the gear stages, and a shift lever having a neutral range and at least one running range for operating the gear stage selecting means so that the neutral gear stage is selected when the shift lever is in the neutral range, and one of the first and higher gear stages is selected when the shift lever is in the running range, the improvement comprising shift position detecting means for detecting that the shift lever is in the running range, engine idle detecting means for detecting that the engine output control means is in the idle position, vehicle stop detecting means for detecting that the vehicle is stopped, brake detecting means for detecting that the vehicle brake means is engaged, control means responsive to output signals from said detecting means to operate the gear stage selecting means when the shift lever is in the running range and the vehicle is stopped, so that the gear mechanism is shifted to the higher gear stage when the engine control means is in the idle position and the vehicle brake means is engaged. According to the above features of the present invention, the transmission gear mechanism is shifted down to the first stage when the vehicle brake means is released. At this instance, the driving torque transmitted to the driving wheels is stepwisely increased. This may cause an uncomfortable shock under certain operating conditions. For example, in the engine warming up period, or when an engine driven facility such as the air conditioner is in operation, the engine is being operated at an increased idle speed so that there is a possibility that the vehicle starts to run very suddenly beyond the driver's expectation when the vehicle brake means is released and the gear mechanism is shifted down to the first stage. In one aspect of the present invention, therefore, the transmission gear mechanism is held in the first stage even when the above conditions are met if the engine is being operated under an increased idle speed.

The above and other objects and features of the present invention will become apparent from the following description of a preferred embodiment taking reference to the accompanying drawings.

DESCRIPTION OF THE PREFERRED EMBODIMENT

Basic Structure of the Transmission

Figure 2:
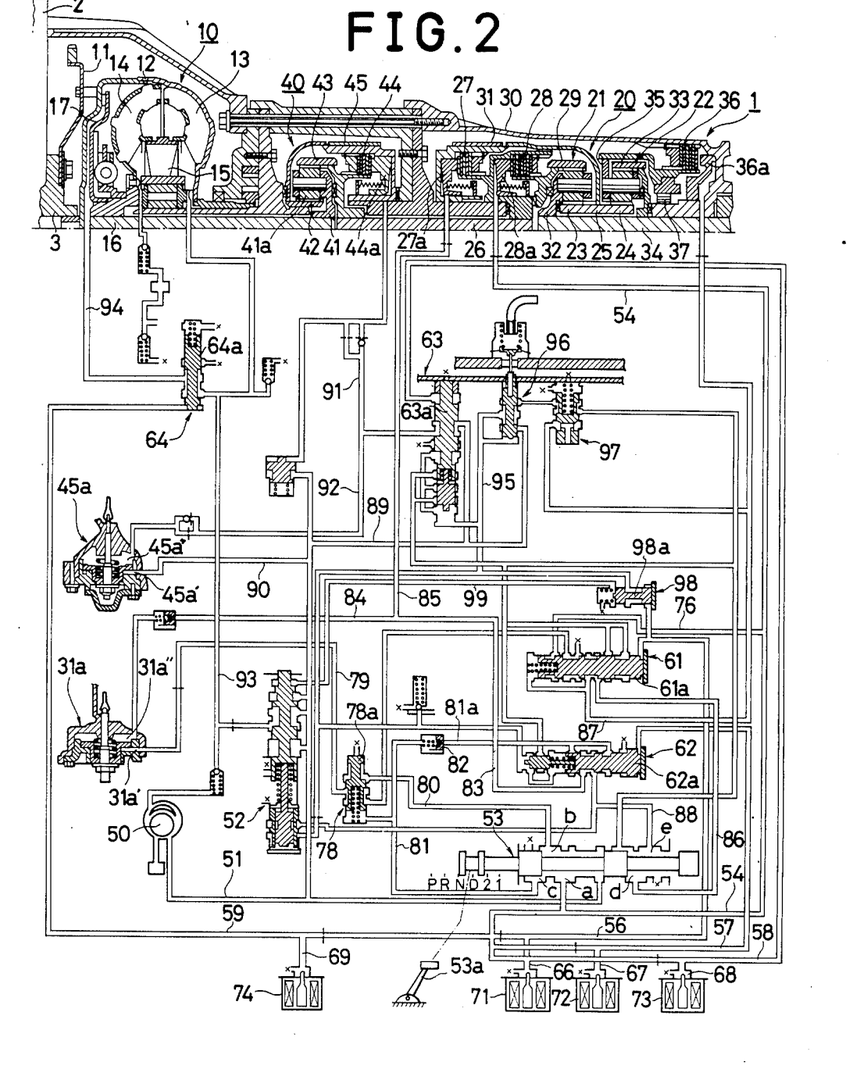
FIG. 2 is a sectional view showing an automatic transmission and its hydraulic control circuit in accordance with one embodiment of the present invention.

Referring now to FIG. 2, there is shown an automatic transmission 1 which comprises a hydraulic torque converter 10, a multiple stage transmission gear mechanism 20, and a planetary gear type over-drive transmission mechanism 40 arranged between the torque converter 10 and the multiple stage transmission gear mechanism 20.

The torque converter 10 has a pump 13 connected with an output shaft 3 of an engine 2 through a drive plate 11 and a converter casing 12, a turbine 14 provided in the casing 12 to face the pump 13 and a stator 15 disposed between the pump 13 and the turbine 14. A converter output shaft 16 is connected with the turbine 14. A lock-up clutch 17 is provided between the converter output shaft 16 and the casing 12, which is connected to the pump 13. The lock-up clutch 17 is normally engaged with the casing 12 under the pressure of hydraulic fluid which circulates in the torque converter 10, and is released by hydraulic pressure, which is drawn to a space between the casing 12 and the clutch 17 from an external pressure source.

The muliple stage transmission gear mechanism 20 has a front planetary gear unit 21 and a rear planetary gear unit 22. The front planetary gear unit 21 has a sun gear 23 connected with a sun gear 24 of the rear planetary gear unit 22 though a connecting rod 25. The gear mecahnism 20 has an input shaft 26 connected through a front clutch 27 with the connecting rod 25, and through a rear clutch 28 with an internal gear 29 of the front planetary gear unit 21. A front brake 31 is provided between the connecting rod 25 or the sun gears 23, 24 of the gear units 21 and 22 and a casing 30 of the transmission. The gear mechanism 20 also has an output shaft 34 connected with a planetary carrier 32 of the front planetary gear unit 21 and an internal gear 33 of the rear planetary gear unit 22. The rear planetary gear unit 22 has a planetary carrier 35, and there are provided between the planetary carrier 35 and the transmission casing 30 a rear brake 36 and a one-way clutch 37.

The planetary gear type over-drive transmission mechanism 40 includes planetary gears 41a, a planetary carrier 41 rotatably carrying the planetary gears 41a and connected with the output shaft 16 of the torque converter 10, a sun gear 42 engaged with the planetary gears 41a, and an internal gear 43 which is also engaged with the planetary gears 41a and connected with the sun gear 42 through a direct connecting clutch 44. An over-drive brake 45 is provided between the sun gear 42 and the transmission casing 30. The internal gear 43 is connected with the input shaft 26 of the multiple stage transmission gear mechanism 20.

The multiple stage transmission gear mechanism 20 is of a known type and can provide three forward driving gear stages and one reverse stage through selective engagements of the clutches and brakes. The relationships between the forward gear stages and the engagements of the clutches and brakes are shown in Table 1, together with typical values of gear ratios in the gear stages. The planetary gear type over-drive transmission mechanism 40 connects the shafts 16 and 26 directly when the direct connection clutch 44 is engaged and the brake 45 is released, and provides an over-drive connection between the shafts 16 and 26 when the brake 45 is engaged and the clutch 44 is released. This function is shown in Table 2 together with typical values of the gear ratios.

TABLE 1

| GEAR STAGE | FRONT CLUTCH 27 | REAR CLUTCH 28 | FRONT BRAKE 31 | REAR BRAKE 36 | GEAR RATIO |
|---|---|---|---|---|---|
| 1 |  | o |  | o | 2.841 |
| 2 |  | o | o |  | 1.541 |
| 3 | o | o |  |  | 1.000 |

TABLE 2

| GEAR STAGE | DIRECT CONNECT CLUTCH 44 | OVER-DRIVE BRAKE 45 | GEAR RATIO |
|---|---|---|---|
| DIRECT | o |  | 1.000 |
| OVER-DRIVE |  | o | 0.720 |

It will be understood that, by combining the three forward gear stages in the gear mechanism 20 and the two gear stages in the over-drive transmission gear mechanism 40, it becomes possible to obtain six gear stages of different overall gear ratios.

Hydraulic Control Circuit

The above-mentioned automatic transmission is provided with a hydraulic control circuit as shown in FIG. 2. The hydraulic control circuit has an oil pump 50 which is driven by the engine output shaft 3. Hydraulic oil is discharged under pressure from the pump 50 into a pressure line 51. The oil pressure is reduced by a pressure regulating valve 52 and applied to a select valve 53. The select valve 53 has a plunger which can be selectively positioned by means of a shift lever 53a in one of the shift positions 1, 2, D, N, R and P. When the plunger is positioned in one of the shift positions 1, 2 and D, the pressure line 51 is communicated with ports a, b, c of the select valve 53. The port a is communicated with a hydraulic actuator 28a for the rear clutch 28 through a line 54. When the select valve 53 is positioned in the above mentioned position, the actuator 28a makes the rear clutch 28 engage. The port a is also communicated with the left-hand end portion of a 1-2 shift valve 61 having a spool 61a which is now biased rightward in FIG. 2 under the oil pressure from the port a. The port a is further communicated with the right-hand end portion of the 1-2 shift valve 61 through a first line 56, the right-hand end portion of a 2-3 shift valve 62 through a second line 57, and the upper end portion of 3-4 shift valve 63 through a third line 58. First, second and third drain lines 66, 67 and 68 are provided in the first, second and third lines 56, 57 and 58, respectively. These drain lines 66, 67 and 68 are respectively provided with a first, second and third solenoid valves 71, 72 and 73 for opening and closing them. When the port a is communicated with the line 51 and the solenoid valves 71, 72 and 73 are energized to close the drain lines 66, 67, 68, the pressure is built up in the first, second and third line 56, 57, 58.

The port b is communicated with a second lock valve 78 through a line 80. The oil pressure which is applied from the port b to the second lock valve 78 acts to bias the spool 78a of the valve 78 downwards. When the spool 78a of the valve 78 is in the lower position, the line 80 is communicated with the line 79 so that the oil pressure is introduced into a brake engaging pressure chamber 31a' of an actuator 31a to engage the front brake 31. The port c is communicated with the second lock valve 78 through a line 81. The oil pressure which is applied from the port c to the second lock valve 78 acts to bias the spool 78a of the valve 78 upward. The port c is also communicated with the 2-3 shift valve 62 through a pressure line 81a having an orifice check valve 82. The line 81a is communicated with a line 83 when the spool 62a of the 2-3 shift valve 62 is moved leftward by the pressure in the second line 57, which increases upon energizing the solenoid valve 72 in the drain line 67. The line 83 is communicated through a line 84 with the releasing pressure chamber 31a'' of the actuator 31a. When oil pressure is introduced into the releasing pressure chamber 31a'', the actuator 31a is moved to release the brake 31 against the pressure in the engaging pressure chamber 31a'. Further, the pressure in the line 83 is introduced through a line 85 into the actuator 27a for the front clutch 27 to make the clutch 27 engage.

The select valve 53 has a port d which is communicated with the pressure line 51 when the valve 53 is positioned in the position 1. The port d is communicated with the 1-2 shift valve 61 through a line 86, and from there with an actuator 36a for the rear brake 36 further through a line 87. When the solenoid valves 71 and 72 are energized, the spools 61a and 62a of the 1-2 shift valve 61 and the 2-3 shift valve 62 are moved to thereby change the port connections for engaging appropriate brakes and/or clutches to establish 1-2, 2-3 shifting operations, respectively. The hydraulic control circuit is also provided with a cut-back balve 98 for making the oil pressure from the pressure regulating valve 52 stable, a vacuum throttle valve 96 for varying the line pressure supplied from the pressure regulating valve 52 through a line 89 according to the suction pressure in the engine intake passage, and a valve 97 for backing up the throttle valve 96. The throttle pressure from the vacuum throttle valve 96 is supplied to a line 95.

Furthermore, this hydraulic control circuit is provided with an actuator 44a for controlling the clutch 44 and an actuator 45a for the brake 45 of the planetary gear type over-drive transmission mechanism 40. The actuator 45a has an engaging pressure chamber 45a' communicated with the pressure line 51 through a line 90. The brake 45 is operated when the actuator 45a is moved under the pressure in the line 51. The pressure line 51 is connected through a line 89 with the 3-4 shift valve 63. When the solenoid valve 73 is energized, the spool 63a of the 3-4 shift valve 63 is moved downward to communicate the pressure line 51 through the line 89 with a line 91 so that the oil pressure is introduced into the line 91. The oil pressure introduced into the line 91 acts through a line 92 on a releasing pressure chamber 45a'' of the actuators 45a to release the brake 45, and on the actuator 44a to make the clutch 44 engage.

Still further, the present hydraulic control circuit is provided with a lock-up control valve 64, which is communicated with the port of the select valve 53 through a line 59. From the line 59 extends a drain line 69 which is provided with a solenoid valve 74. When the pressure in the line 59 increases by closing the drain line 69 with the solenoid valve 74 being energized, the lock-up control valve 64 has its spool 64a moves upward to cut the communication between lines 93 and 94 and drain the pressure in the line 94 so that the lock-up clutch 17 is engaged.

In the above arrangement, the relations of the overall gear ratios and the operations of the solenoids, the brakes and the clutches are shown in Table 3.

TABLE 3

| SOLENOID 71 | SOLENOID 72 | SOLENOID 73 | FRONT CLUTCH 27 | REAR CLUTCH 28 | FRONT BRAKE 31 | DIRECT CONNECT CLUTCH 44 | OVER-DRIVE BRAKE 45 | GEAR RATIO |
|---|---|---|---|---|---|---|---|---|
| OFF | OFF | OFF |   | o |   | o |   | 2.841 |
| ON  | OFF | OFF |   | o | o | o |   | 1.541 |
| OFF | ON  | OFF | o | o |   | o |   | 1.000 |
| OFF | OFF | ON  |   | o |   |   | o | 2.046 |
| ON  | ON  | OFF | o | o |   | o |   | 1.000 |
| ON  | OFF | ON  |   | o | o |   | o | 1.110 |
| OFF | ON  | ON  | o | o |   |   | o | 0.720 |
| ON  | ON  | ON  | o | o |   |   | o | 0.720 |

It will be understood from Table 3 that six different gear ratios can be obtained through selective energization of the three solenoids 71, 72 and 73. Thus, it is possible to selectively combine the gear ratios to provide a plurality of operating modes as, for example, shown in Table 4.

TABLE 4

| GEAR STAGE | POWER MODE | NORMAL MODE | ECONOMY MODE A | ECONOMY MODE B |
|---|---|---|---|---|
| 1 | 2.841 | 2.841 | 2.046 | 2.046 |
| 2 | 2.046 | 1.541 | 1.541 | 1.541 |
| 3 | 1.541 | 1.000 | 1.000 | 1.110 |
| 4 | 1.000 | 0.720 | 0.720 | 1.000 |
| 5 | 0.720 |       |       | 0.720 |

In Table 5, there is shown a relationship between the operation of the solenoid 74 and the torque converter lock-up.

TABLE 5

| SOL 74 | Lock-up |
|---|---|
| ON  | engage |
| OFF | release |

General Arrangements

Figure 1:
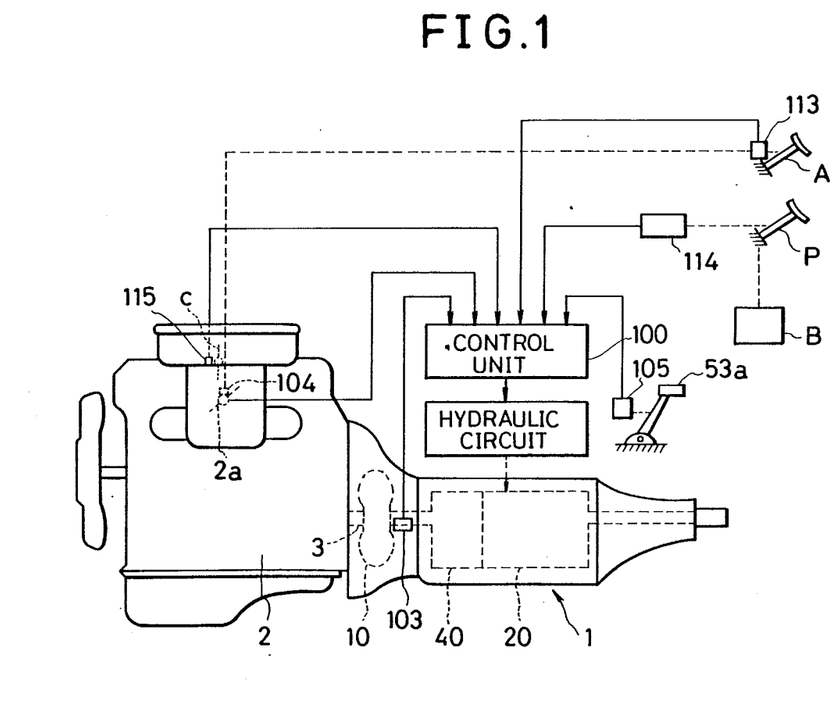
FIG. 1 is a diagrammatical illustration of a vehicle traction system in which the present invention is embodied.

Referring to FIG. 1, it will be noted that an electronic control unit 100 is provided for controlling the above hydraulic circuit. The vehicle is provided with a vehicle brake device B which is actuated by a brake pedal P. For detecting that the brake is engaged, there is provided a brake pedal switch 114 which closes when the brake pedal P is depressed. The engine 2 has a throttle valve 2a which is provided with a throttle position sensor 104. The throttle valve 2a is actuated by a foot pedal A which is provided with an engine idle switch 113 adapted to be closed when the pedal A is released. The turbine 13 of the torque converter 10 is provided with a turbine speed sensors 103 and the shift lever 53a is provided with a shift position sensor 105. The signals from the sensors and switches are applied to the control unit 100, which then controls the hydraulic circuit in accordance with the signals.

Control Unit

Figure 3:
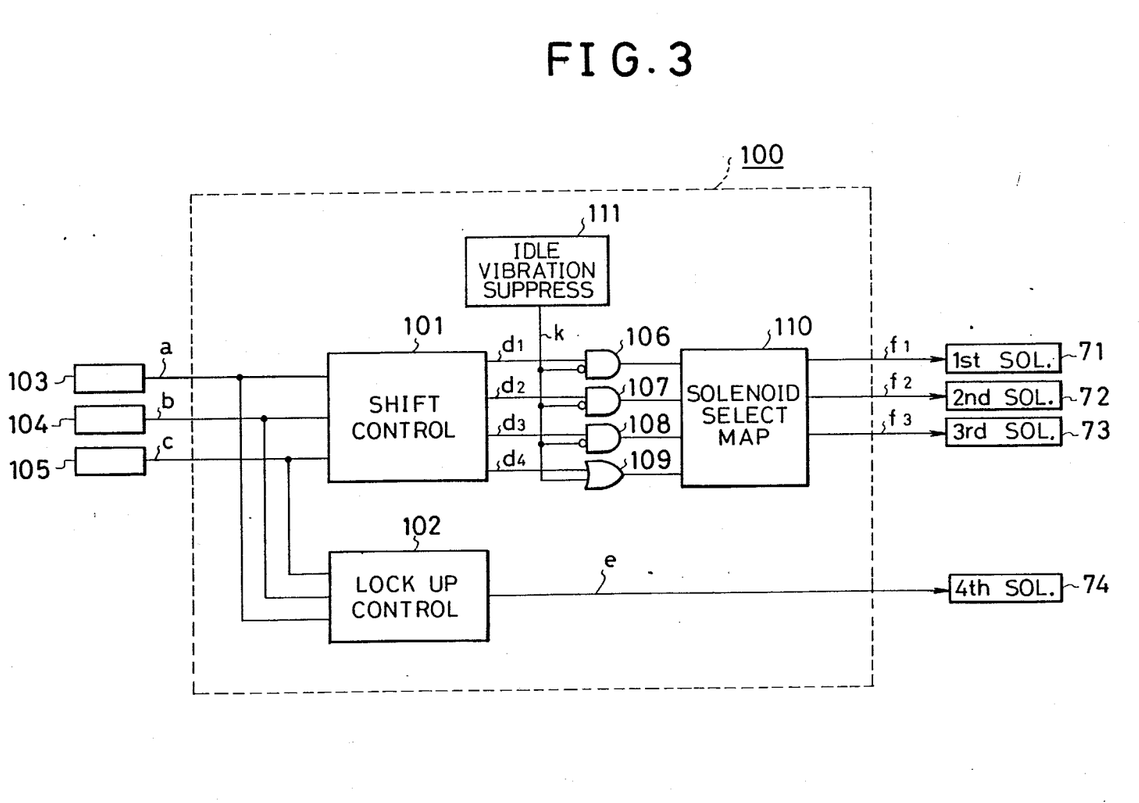
FIG. 3 is a block diagram showing a control unit in accordance with one embodiment of the present invention.
Figure 5:
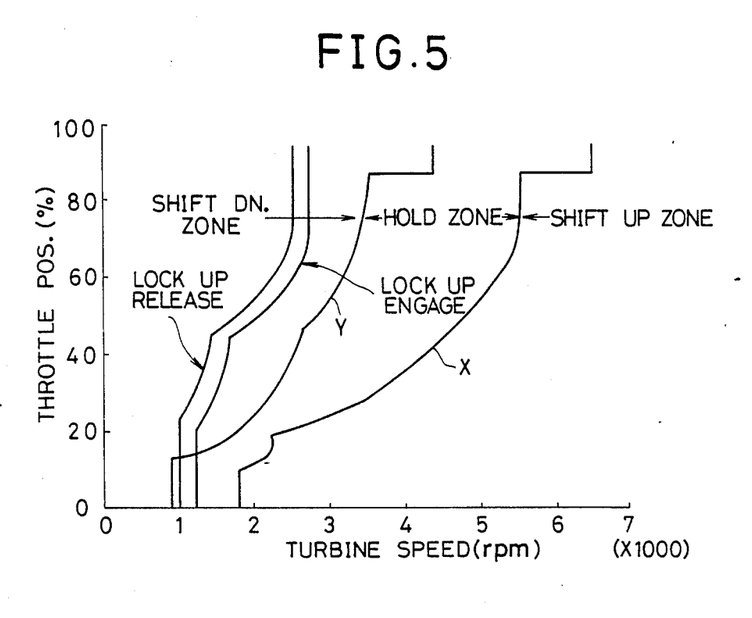
FIG. 5 is a diagram showing an example of the gear shifting map.

Referring now to FIG. 3, it will be noted that the control unit 100 includes a shift control circuit 101 and a lock-up control circuit 102, which are connected with the turbine speed sensor 103, the throttle position sensor 104 and the shift position sensor 105 to receive a turbine speed signal a, a throttle position signal b and a shift position signal c. The circuit 101 functions to judge, based on the input signals a, b and c, whether the engine operating condition is in the shift-up zone, the shift-down zone or in the hold zone, referring to the control map shown in FIG. 5. Similarly, the circuit 102 functions to judge whether the operating condition is in the lock-up zone or not. The circuit 101 produces shift signals $d_1$ through $d_4$, which respectively correspond to the first through fourth gear stages. The circuit 102 produces a lock-up signal e. The outputs for the signals $d_1$ through $d_3$ are applied respectively to one input of AND circuits 106, 107 and 108 and the output for the signal $d_4$ is applied to one input of an OR circuit 109. The outputs of the circuits 106 through 109 are applied to a solenoid selecting map 110 which has outputs $f_1$, $f_2$ and $f_3$ for energizing the solenoids 71, 72 and 73, respectively. The lock-up signal e from the circuit 102 is applied to the solenoid 74 to control the lock-up clutch 17.

It will be noted in FIG. 3 that the control unit 100 further includes an idle vibration suppressing circuit 111. As shown in detail in FIG. 4, the circuit 111 is connected with a D-range switch 112 which is closed when the shift lever 53a is in the D-range to produce a D-range signal g, an idle switch 113 which is closed when the foot pedal A is in the idle position to produce an idle signal h and the aforementioned turbine speed sensor 103. The D-range signal g and the idle signal h are applied to an AND circuit 116. The turbine speed signal a is applied to an F-V converter 117 in which the signal a is converted into a voltage signal. The output signal from the F-V converter 117 is applied to a negative terminal of a comparator 118 to be compared with a reference signal. The comparator 118 produces an output a' which is at a high level when the turbine speed is below a predetermined value, for example, 200 rpm and turns to a low level when the turbine speed increases beyond a second predetermined value, for example, 280 rpm. The signal a' from the comparator 118 is also applied to the AND circuit 116.

Figure 4:
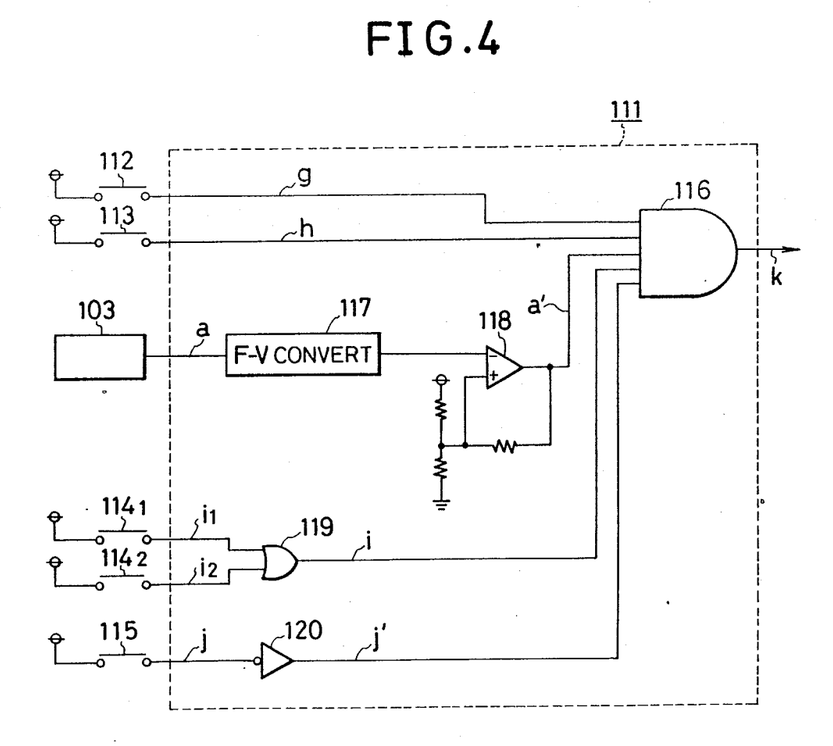
FIG. 4 is a block diagram showing the details of the idle vibration suppress circuit.

In the illustrated embodiment, there is provided a hand brake in addition to the foot brake B and a hand brake switch $114_2$ is provided so as to be closed when the hand brake is engaged to thereby produce a hand brake signal $i_2$. The foot brake switch $114_1$ produces a foot brake signal $i_1$ when closed. The switches $114_1$ and $114_2$ are connected with an OR circuit 119, which produces a high level output i when either or both of the brake signals $i_1$ and $i_2$ are produced. The output of the OR circuit 119 is also applied to the AND circuit 116. The engine 2 is further provided with a choke valve C which has a choke switch 115 for detecting that the choke valve C is in an operative position. The choke switch 115 produces a choke signal j to indicate that the choke valve C is in the operative position and therefore the engine idling speed is high. The signal j from the choke switch 115 is applied to a NOT circuit 120 which produces an inverted signal j'. The inverted signal j' is at a high level when the choke valve C is not in the operative position and is applied to the AND circuit 116.

It will be understood that the AND circuit 116 produces an output k which becomes high level when all of the input signals g, h, a', i and j' are at a high level. In other words, when the shift lever 53a is in the D-range and the vehicle is substantially stopped, the AND circuit 116 produces a high level output k if the engine 2 is idling and the vehicle brake is applied, except in the engine warming up period wherein the engine idling speed is high.

Referring to FIG. 3, it will be noted that the output k from the circuit 111 is applied to the OR circuit 109. Further, the output k is inverted and applied to the AND circuits 106, 107 and 108. Therefore, when the output k is at a low level, the gear stage selection signals $d_1$ through $d_4$ are passed to the solenoid selecting map 110, as they are to thereby select appropriate ones of the solenoids 71 through 74 as determined by the circuits 101 and 102. However, when the output k is at a high level, only the output from the OR circuit 109 is at a high level so that the fourth gear stage is selected by energizing appropriate ones of the solenoids 71, 72 and 73. When the vehicle brake is released to start the vehicle, the output k of the circuit 111 turns to a low level so that the first stage signal $d_1$ which is being produced at this instance is now passed through the AND circuit 106 to the solenoid selecting map 110 to select the first gear stage. It is therefore possible to start the vehicle smoothly utilizing the creep phenomenon of the torque converter 10.

When the engine choke valve C is in operation, the choke switch 115 is closed to produce a high level signal j, which ultimately turns the output k of the circuit 111 to a low level. Therefore, the first gear stage is selected when the vehicle is substantially stopped. In parallel with or in lieu of the choke switch 115, there may be provided a vehicle facility switch such as an air conditioner switch.

According to the present invention, the control unit 100 can be provided by a microprocessor with an appropriate program. The operation will now be described with reference to FIGS. 6 through 13.

General Operation

Figure 6:
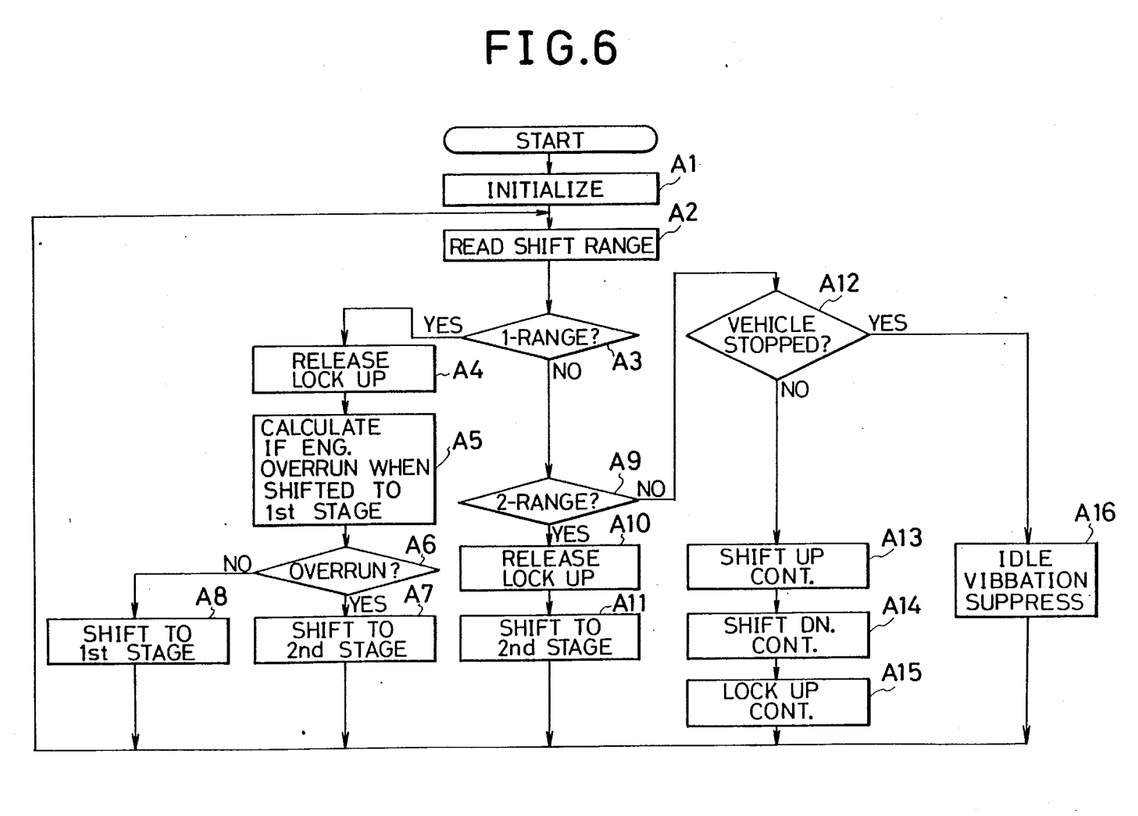
FIG. 6 is a program flow chart showing the general operation of the control unit.

FIG. 6 shows in general the operation of the control unit. When the program is initialized at the step $A_1$, the ports in the respective hydraulic control valves and the circuit are brought into initialized positions to thereby hold the gear mechanism at the first stage and release the torque converter lock-up clutch 17. Thereafter, the shift range or the position of the select valve 53 is read at the step $A_2$ and a judgement is carried out in the step $A_3$ as to whether the shift range is in the 1-range. If the judgement is YES, a signal is produced in the step $A_4$ to de-energize the solenoid 74 so as to release the lock-up clutch 17. Then, a calculation is made in the step $A_5$ to determine whether the engine will overrun if the gear mechanism is shifted down to the first stage. A judgement is then made in the step $A_6$ as to whether the engine will overrun based on the result of the calculation in the step $A_5$. If the judgement is YES, a signal is produced to shift the gear mechanism to the second stage in the step $A_7$. If the judgement in the step $A_6$ is NO, a signal is produced to shift the gear mechanism to the first stage in the step $A_8$. If the judgement in the step $A_3$ is NO, a further judgement is carried out in the step $A_9$ as to whether the shift range is at the "2" range. If the judgement is YES, a signal is applied in the step $A_{10}$ to energize the solenoid valve 74 to release the lock-up clutch 17, and a further signal is applied in the step $A_{11}$ to fix the gear mechanism at the second stage. If the judgement is to indicate that the shift range is not at the second stage, it is interpreted that the shift valve 53 is in the "D" range. Then, a judgement is made in the step $A_{12}$ as to whether the vehicle is stopped and, if the result of the judgement is NO, the shift-up control, the shift-down control and the lock-up control are carried out, respectively, in the steps $A_{13}$, $A_{14}$ and $A_{15}$. If the judgement is the step $A_{12}$ is YES, an idle vibration suppress control is carried out in the step $A_{16}$.

Shift-up Control

Figure 7:
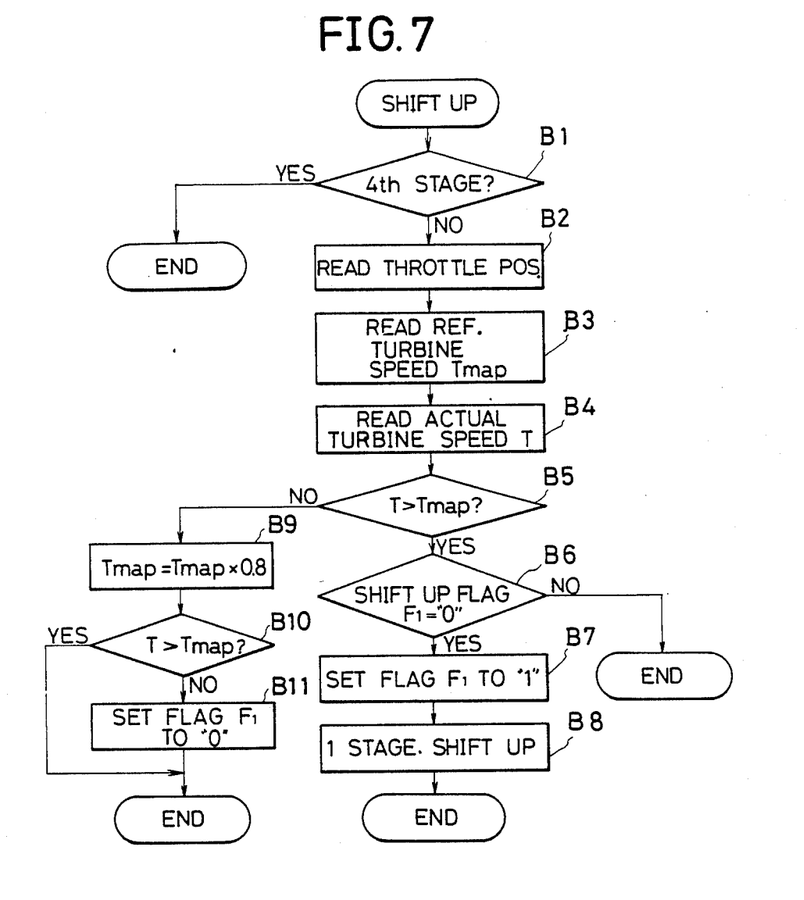
FIG. 7 is a flow chart showing the steps of shift-up control.
Figure 8:
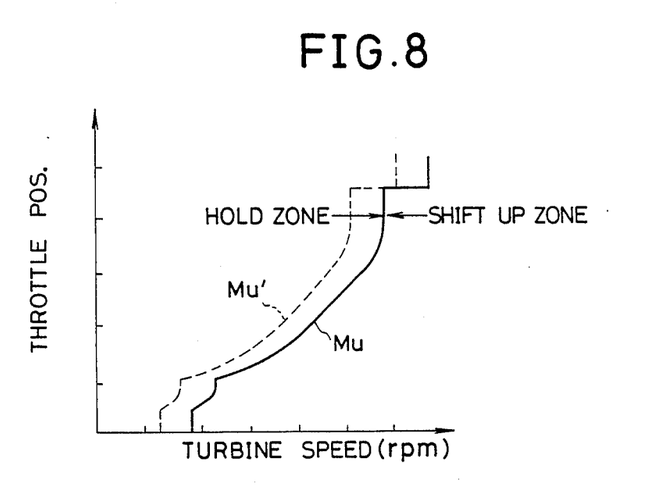
FIG. 8 is a diagram showing the shift-up map.

Referring to FIG. 7, the gear position of the transmission gear mechanism 20 is at first read and a judgement is made in the step $B_1$ as to whether the gear mechanism 20 is at the fourth stage. If the judgement is YES, the shift-up control is terminated because no further shift-up is possible. If the fourth gear stage judgement in the step $B_1$ is NO, the engine throttle valve position is read in the step $B_2$ and a reference turbine speed Tmap is read in the step $B_3$ from the selected shift-up control line Mu which is shown in FIG. 8. Thereafter, the actual turbine speed T is read in the step $B_4$ and a judgement is made in the step $B_5$ as to whether the actual turbine speed T is greater than the reference turbine speed Tmap. If the judgement is YES, a further judgement is made in the step $B_6$ as to whether the shift-up flag $F_1$ is set to zero. If the result of the judgement is NO, the procedure is terminated but, if the judgement is YES, the shift-up flag $F_1$ is set to one in the step $B_7$ and one stage shift up is carried out in the step $B_8$ by appropriately energizing the solenoids 71, 72 and 73.

If the judgement in the step $B_5$ is NO, a new shift up control line Mu' is provided as shown in FIG. 8 by multiplying in the step $B_9$ the reference turbine speed Tmap with a constant 0.8 to obtain a new reference speed Tmap. Then, a judgement is made in the step $B_{10}$ as to whether the actual turbine speed T is greater than the new reference speed Tmap. If the result of the judgement is YES, the procedure is terminated but, if the judgement is NO, the shift up flag $F_1$ is reset to zero in the step $B_{11}$. The steps $B_9$ through $B_{11}$ are performed in order to prevent the gear shifting operations from being repeatedly carried out when the turbine speed T is close to the reference turbine speed Tmap.

Shift Down Control

Figure 9:
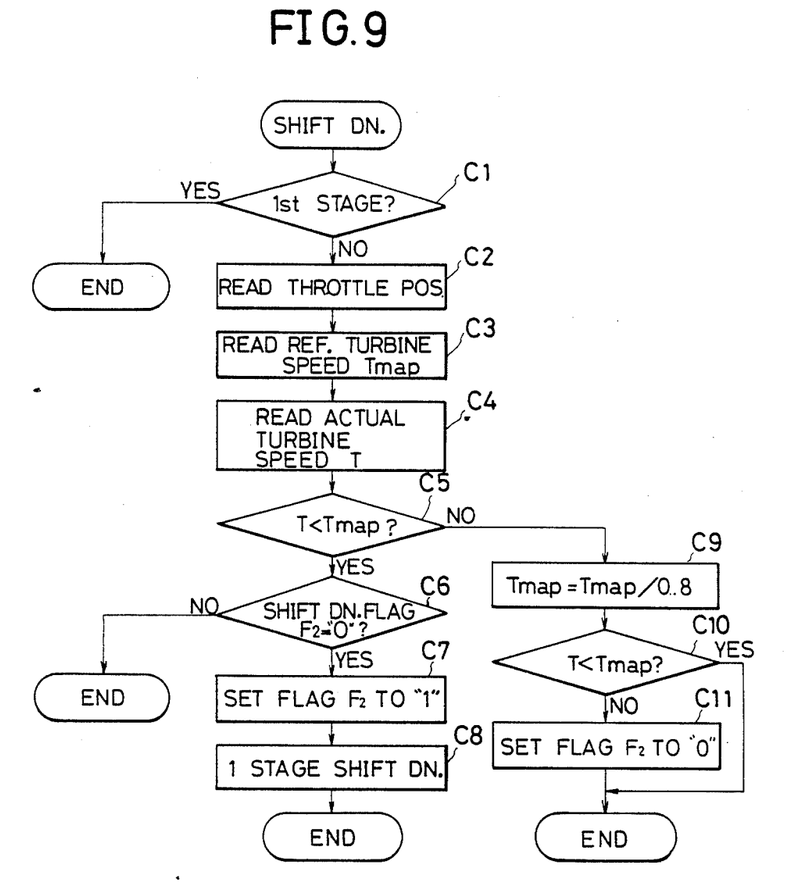
FIG. 9 is a flow chart showing the steps of shift-down control.

As shown in FIG. 9, in the gear shift down control, the gear position of the transmission gear mechanism 20 is at first read and a judgement is made in the step $C_1$ as to whether the gear mechanism is at the first stage. If the judgement is YES, no further control can be carried out so that the control is finished.

Figure 10:
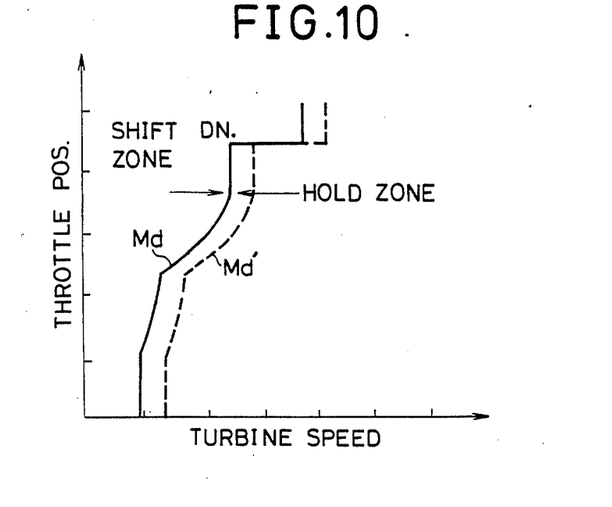
FIG. 10 is a diagram showing the shift-down map.

If the aforementioned judgement is NO, the engine throttle valve position is read in the step $C_2$ and a reference turbine speed Tmap is read in the step $C_3$ from the selected shift down control line Md which is shown in FIG. 10. Thereafter, the actual turbine speed T is read in the step $C_4$. Then, a judgement is made in the step $C_5$ as to whether the actual turbine speed T is smaller than the reference turbine speed Tmap. If the result of the judgement is YES, a further judgement is made in the step $C_6$ as to whether the shift down flag $F_2$ is in the zero position. If the result of the judgement is NO, the procedure is terminated but, if the result of the judgement is YES, the shift down flag $F_2$ is set to one in the step $C_7$ and a one-stage shift down is carried out in the step $C_8$.

If the judgement in the step $C_5$ is NO, a new shift down control line Md' is provided as shown in FIG. 10. This is in effect carried out by dividing in the step $C_9$ the reference turbine speed Tmap by a constant 0.8 to obtain a new reference turbine speed Tmap. Then, a judgement is made in the step $C_{10}$ as to whether the new reference turbine speed Tmap is smaller than the actual turbine speed. If the result of the judgement is YES, the procedure is terminated but, if the result of the judgement is NO, the shift down flag $F_2$ is reset to zero in the step $C_{11}$.

Lock Up Control

Figure 11:
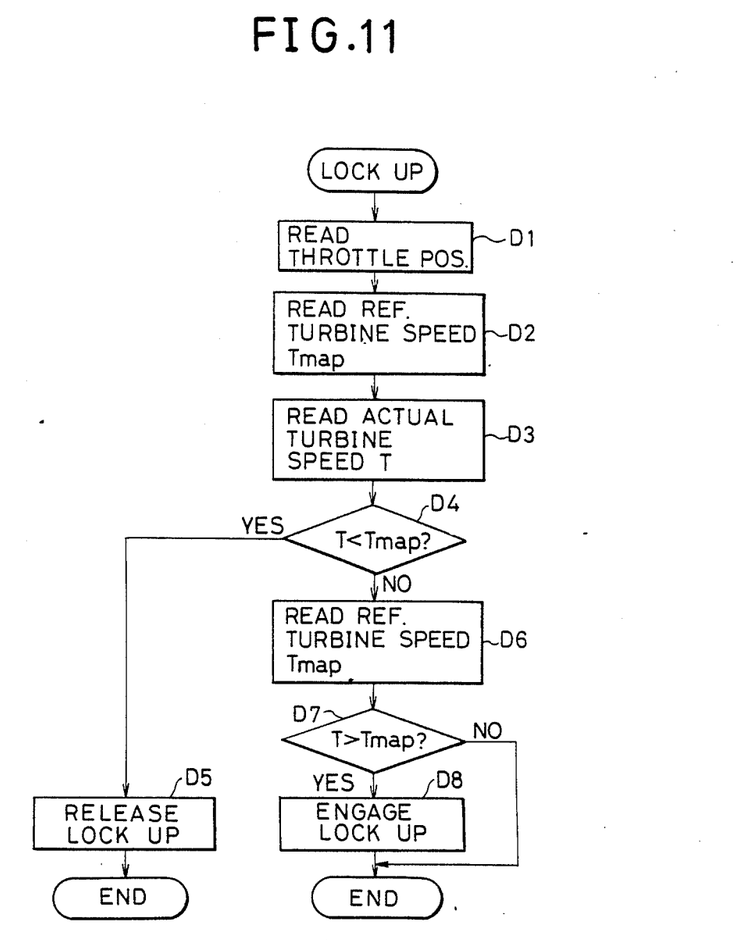
FIG. 11 is a flow chart showing the steps of converter lock-up control.
Figure 12:
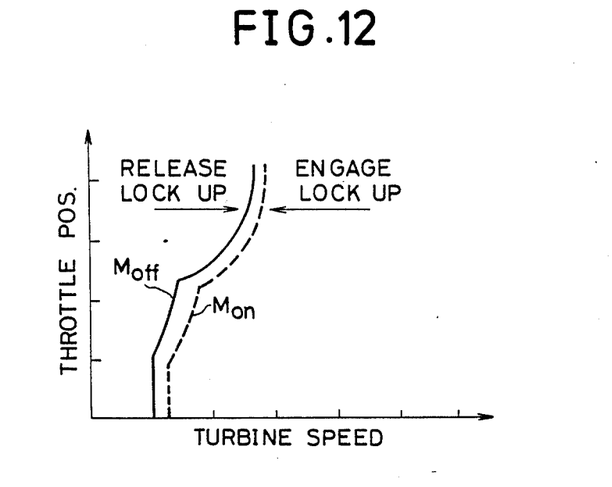
FIG. 12 is a diagram showing the lock-up map.

Referring to FIG. 11, the engine throttle valve position is read in the step $D_1$ and a reference turbine speed Tmap is read in the step $D_2$ from the lock up release line Moff as shown in FIG. 12. Then, the actual turbine speed T is read in the step $D_3$ and a judgement is made in the step $D_4$ as to whether the actual turbine speed T is smaller than the reference turbine speed Tmap. If the result of the judgement is YES, the step $D_5$ is carried out to release the lock-up clutch 17 but, if the result of the judgement is NO, a further reference turbine speed Tmap is read in the step $D_6$ from the lock up engage line Mon. Thereafter, a judgement is made in the step $D_7$ as to whether the actual turbine speed T is greater than the reference turbine speed Tmap. If the result of the judgement is NO, the procedure is finished. If the judgement is YES, a signal is produced in the step $D_8$ to engage the lock up clutch 17.

Idle Vibration Suppressing

Figure 13:
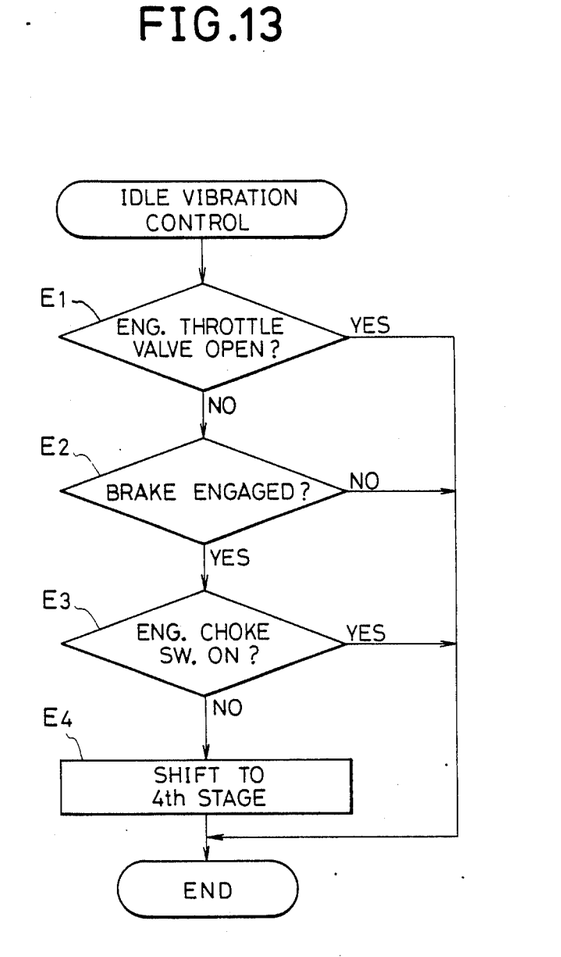
FIG. 13 is a flow chart showing the operation for suppressing idle vibrations.

Referring again to FIG. 6, if the judgement in the step $A_{12}$ shows that the vehicle is substantially stopped, a process of suppressing idle vibrations by blocking transmittal of the engine idle vibrations to the vehicle body. The process is shown in FIG. 13.

When the shift lever 53a is in the D-range and the vehicle is substantially stopped, a judgement is made in the step $E_1$ as to whether the engine throttle valve 2a is opened. If the answer is YES, the procedure comes to the end but, if the answer is NO, a further judgement is made in the step $E_2$ as to whether the vehicle brake is engaged. If it is judged that the vehicle brake is not engaged, the procedure comes to the end; however, if the vehicle brake is engaged, a further judgement is made in the step $E_3$ as to whether the choke switch 115 is closed. If the choke switch is closed, the procedure comes to the end. If the choke switch 115 is not closed, it is judged that the choke valve C is not in the operative position and the step $E_4$ is carried out to shift up the gear mechanism to the fourth stage.

In the embodiments described above, the gear mechanism is positioned to the fourth stage to block the transmission of the engine idle vibrations to the vehicle body; however, it is quite possible to use another gear stage, for example, the third gear stage. Further, a similar control may be made when the shift lever is in another running range, such as the 2-range or the 1-range. Therefore, it should be construed that the invention is not limited to the details of the embodiments shown, but changes and modifications may be made without departing from the scope of the appended claims.

We claim:

1. A vehicle having vehicle brake means, an engine provided with engine output control means having an idle position, an automatic transmission comprising a torque converter having a turbine, a multiple-stage transmission gear mechanism connected with the turbine of the torque converter and having a neutral gear stage, a first gear stage and at least one higher gear stage, gear stage selecting means for selecting one of the gear stages, and a shift lever having a neutral range and at least one running range for operating the gear stage selecting means so that the neutral gear stage is selected when the shift lever is in the neutral range and one of the first and higher gear stages is selected when the shift lever is in the running range, the improvement comprising shift position detecting means for detecting that the shift lever is in the running range, engine idle detecting means for detecting that the engine output control means is in the idle position, vehicle stop detecting means for detecting that the vehicle is substantially stopped, vehicle brake detecting means for detecting that the vehicle brake means is engaged, control means responsive to output signals from said detecting means to operate the gear stage selecting means when the shift lever is in the running range and the vehicle is stopped so that the gear mechanism is shifted to the higher gear stage in an instance wherein the engine output control means is in the idle position and the vehicle brake means is engaged, which vehicle further includes idle up detecting means for detecting that the engine is operated with an increased idle speed, said control means including means for prohibiting a shift up to the higher gear stage when the engine is operated with the increased idle speed under a condition wherein the shift lever is in the running range, the vehicle is stopped, the engine output control means is in the idle position and the vehicle brake means is engaged.

2. A vehicle in accordance with claim 1 in which said idle up detecting means is choke switch means which detects that engine choke valve means is in an operative position.

* * * * *